Figure 1:
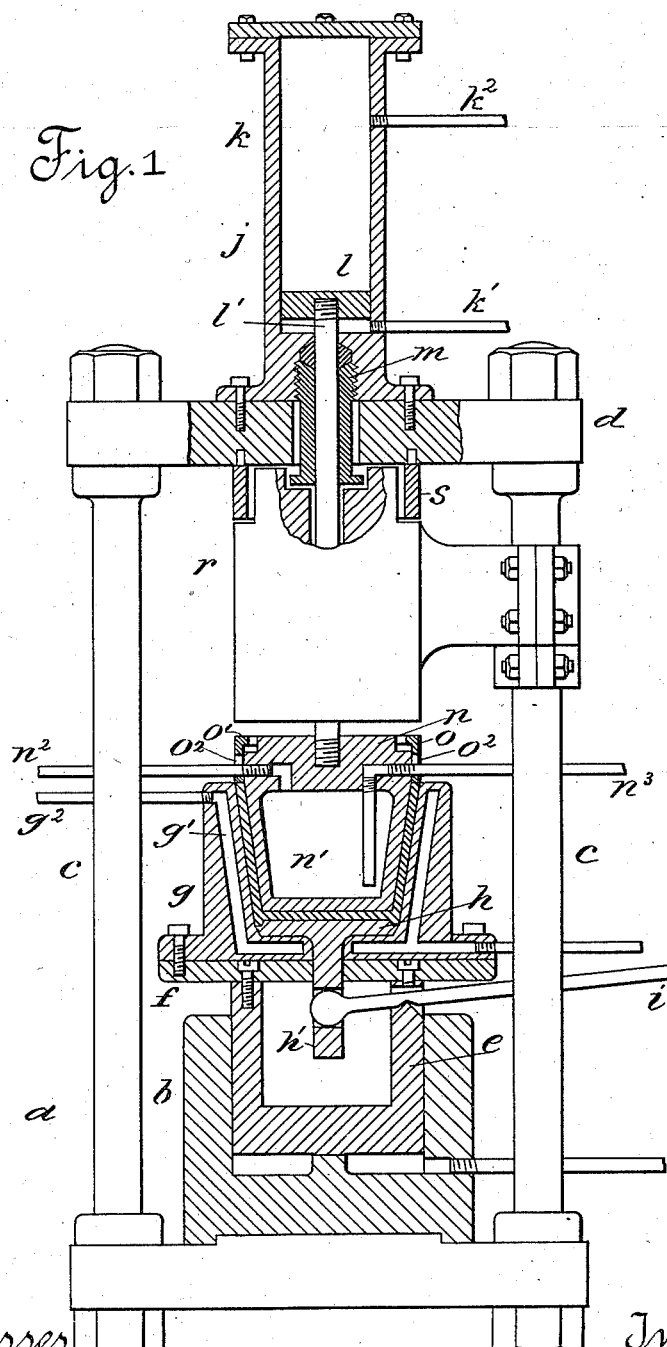

(No Model.) 2 Sheets—Sheet 1.

G. W. LARAWAY & J. E. WEST.
PRESS FOR FINISHING MOLDED ARTICLES.

No. 526,717. Patented Oct. 2, 1894.

Witnesses
Chas. B. Chandler
G. B. Jenkins

Inventors
George W. Laraway
and Josiah E. West
by Chas. L. Burdett,
attorney (No Model.) 2 Sheets—Sheet 2.
G. W. LARAWAY & J. E. WEST.
PRESS FOR FINISHING MOLDED ARTICLES.
No. 526,717. Patented Oct. 2, 1894.
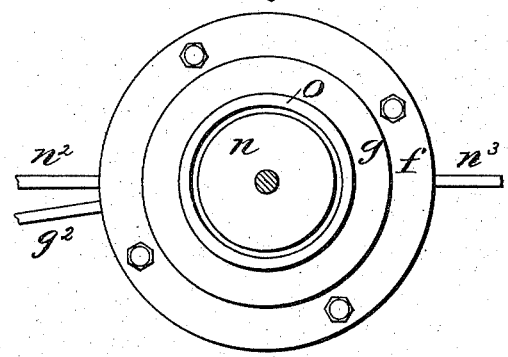
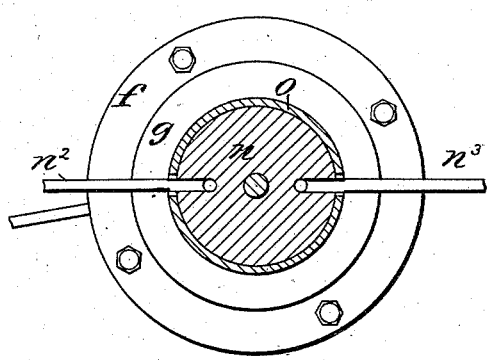
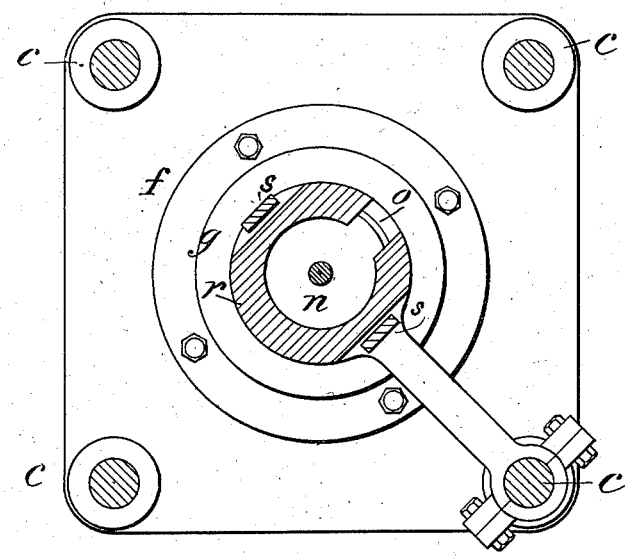
Witnesses
Chas. B. Chandler
G. B. Jenkins.
Inventors
George W. Laraway
and Josiah E. West
by Chas. L. Burdett,
Attorney

UNITED STATES PATENT OFFICE.

GEORGE W. LARAWAY, OF HARTFORD, CONNECTICUT, AND JOSIAH E. WEST, OF ST. CLOUD, MINNESOTA; SAID LARAWAY ASSIGNOR TO SAID WEST.

PRESS FOR FINISHING MOLDED ARTICLES.

SPECIFICATION forming part of Letters Patent No. 526,717, dated October 2, 1894.

Application filed April 20, 1892. Serial No. 429,855. (No model.)

*To all whom it may concern:*

Be it known that we, GEORGE W. LARAWAY, of Hartford, in the county of Hartford and State of Connecticut, and JOSIAH E. WEST, of St. Cloud, in the county of Stearns and State of Minnesota, have invented certain new and useful Improvements in Presses for Finishing Molded Articles, of which the following is a full, clear, and exact description, whereby any one skilled in the art can make and use the same.

The object of our invention is to provide means by which articles that have been molded to shape by great pressure and heat may be rapidly finished without retarding the work, as the economy in the production of such articles depends largely upon the rapidity with which they can be formed in the press.

Our invention consists in the details of the several parts making up the finishing machine as a whole, and in their combination, as more particularly hereinafter described and pointed out in the claims.

Referring to the drawings:—Figure 1 is a detail view in elevation of the finishing machine with parts cut away in section to show construction. Fig. 2 is a detail plan view of the top of the central mold section. Fig. 3 is a detail view in horizontal section through the central mold part, on the line of the inlet and outlet pipes to the central mold part. Fig. 4 is a detail view in horizontal section through the upper part of the press and swinging block, on a line just underneath the stuffing box.

The articles that are to be finished in our improved machine and process are molded from what is known as paper pulp or fiber, but more especially from material in a finely powdered dry state combined with resinous gums that require heat as well as pressure in the formation of the article. After such an article has been pressed to shape in molds in any suitable manner it is removed from such a machine and in that condition is ready to be operated upon in the within described finishing machine in order to give the article the required strength and finish.

In the accompanying drawings the letter $a$ denotes the frame of a press, preferably hydraulic; $b$, the press cylinder; $c$, the press posts and $d$ the cross-head or top-plate that is supported by the posts that are usually four in number. Within the press is arranged the usual ram or plunger $e$ that supports the platen $f$ and on this platen is supported the mold part $g$ of a sectional mold that has a socket of suitable shape to receive the article that is to be finished in the press. This mold part $g$ has a chamber $g'$ with inlet pipes $g^2$ and outlet pipes $g^3$ that enable a constant stream of cold water to be flowed through the chamber while the press is in operation, and it is the object of the device to thoroughly cool the article during the finishing process. Within the socket is preferably arranged a movable bottom plate $h$ having a stem $h'$ extending downward through the bottom of the mold and platen and so connected to a lever $i$ as to enable the bottom plate to be lifted to a greater or less degree in order to start the article out of the socket in the mold after it has been finished. The lever is fulcrumed in a suitable position on the edge of the outlet in the ram through which the lever passses.

On the cross-head $d$ is supported a lifting device $j$ that comprises a steam cylinder $k$ having the two supply pipes $k'$ $k^2$ properly located to reciprocate the piston $l$ located within the steam cylinder. To this piston is secured the piston rod $l'$ that extends downward through a stuffing box $m$ and has secured to its lower end a mold part $n$ of the sectional mold that forms a complementary mold part fitting the reverse side of the article that is held in the socket in the lower mold $g$. This central mold part $n$ has a chamber $n'$ and connected to it are an inlet pipe $n^2$ and an outlet pipe $n^3$, said pipes being flexible to allow for the necessary movement of the central mold part and the pipe $n^3$ having a branch extending to a point near the bottom of the chamber to enable water to be forced completely out of the chamber when necessary, the pipes being used, however, to maintain a constant circulation of water through the central mold section. The upper part of the mold section supports a sliding ring $o$ that has a flange $o'$ fitting a shoulder on the mold and thus allowing the ring a limited vertical movement. When the ring is at the upper limit of its play its edge is flush with the upper surface of the mold and its lower edge forms the remaining section of the mold needed to inclose the article (in this case a pail) that is being finished in the press. The ring is provided with slots $o^2$ on opposite sides so as to permit the pipes $n^2$ and $n^3$ to be connected to the mold part and yet allow the ring to have sufficient vertical play. The pipes $n^2$ $n^3$ by bearing on the bottom walls of the slots $o^2$, prevent the separation of the ring from the mold member $n$, by moving too far upwardly. The slides are shown herein as being closed on the lower side of the ring, but if desired they may be open.

To one of the mold posts is pivotally connected a swinging block $r$ that is so arranged as to be brought into position directly over the top of the mold part $n$ and underlying the cross-head $d$ and forming a sort of filling piece. This block is slotted along one side so as to prevent the piston rod from forming any obstruction to its movement. When this swinging block $r$ is in position the ram of the press may be lifted and the article held within the mold subjected to a pressure of any degree within the capacity of the press.

The article is removed from the press by swinging the block $r$ to one side and then by means of the lifting device $j$ raising the central mold section that carries with it the molded article. As the upward movement of this central mold part $n$ continues the upper edge of the ring $o$ finally encounters the lower edge of the stripping device $s$ that consists of a series of blocks secured to the lower side of the cross-head $d$, and the ring $o$ moving downward thrusts against the upper edge of the pail or other article and strips it from the mold without injuring it. The lever $i$ may be used if need be to lift the disk $h$ to aid the removal of the article from the lower section of the press when the lifting device is first put into operation.

By means of this apparatus a pail or other hollow molded article can be finished with great rapidity and certainty.

The surface of the article that has been in contact with the mold has a peculiarly dense, hard and finely polished surface as the result of the operation.

We claim as our invention—

1. In a press for finishing molded articles in combination a central mold part suspended from a lifting device, the mold lifting device, the flanged sliding ring arranged on the top of the mold part, the stripping blocks $s$ secured in the path of movement of the ring $o$ and the outer mold part, all substantially as described.

2. In a press for finishing molded articles in combination the outer and chambered mold part supported on the plunger of the press, the inlet pipe entering the top of the chamber and the outlet pipe connected to the lower part of the chamber, a movable disk forming the bottom part of the socket within the said mold part, a chambered central part suspended from a lifting device, the lifting device, the flanged sliding ring supported on the top of the central mold part, and the stripping device arranged in the path of movement of the ring, all substantially as described.

3. In combination in a press the sectional mold, the central mold part suspended from a lifting device, the lifting device, and a swinging block arranged to be interposed between the central mold part and the cross head of the press, all substantially as described.

4. In combination with a press, a sectional mold having a central section supported by a lifting device, the chamber within the central mold section, a fluid supply pipe with a branch extending to the bottom of the chamber, the flanged sliding ring supported on the top of the central mold part, the stripping block secured to the cross head of the press in the line of the path of movement of the sliding ring, and the lifting device, all substantially as described.

5. In a press in combination with the platen supported on the plunger, the sectional mold the outer section of which is adapted to be supported on the platen, the cross head supported on the press posts and a swinging block adapted to be interposed between the cross head and the sectional mold, all substantially as described.

GEORGE W. LARAWAY.
JOSIAH E. WEST.

Witnesses as to signature of George W. Laraway:
CHAS. L. BURDETT,
A. B. JENKINS.

Witnesses as to signature of Josiah E. West:
GERTRUDE CAMBELL,
F. J. BACH.